US012467543B2

(12) United States Patent
Rybicki et al.

(10) Patent No.: US 12,467,543 B2
(45) Date of Patent: Nov. 11, 2025

(54) FUSE-COATED BALL VALVE TRIM

(71) Applicant: CALLIDUS PROCESS SOLUTIONS PTY LTD, Balcatta (AU)

(72) Inventors: Joel Rybicki, Balcatta (AU); Duncan Bews, Balcatta (AU); Gary Lantzke, Balcatta (AU); Joe Ellis, Balcatta (AU); David Wood, Balcatta (AU)

(73) Assignee: CALLIDUS PROCESS SOLUTIONS PTY LTD, Balcatta (AU)

( * ) Notice: Subject to any disclaimer, the term of this patent is extended or adjusted under 35 U.S.C. 154(b) by 328 days.

(21) Appl. No.: 17/797,413

(22) PCT Filed: Feb. 1, 2021

(86) PCT No.: PCT/IB2021/050761
§ 371 (c)(1),
(2) Date: Aug. 3, 2022

(87) PCT Pub. No.: WO2021/156724
PCT Pub. Date: Aug. 12, 2021

(65) Prior Publication Data
US 2023/0067445 A1    Mar. 2, 2023

(30) Foreign Application Priority Data
Feb. 4, 2020   (AU) .............................. 2020900303

(51) Int. Cl.
*F16K 5/06*    (2006.01)
(52) U.S. Cl.
CPC .......... *F16K 5/0657* (2013.01); *F16K 5/0605* (2013.01)

(58) Field of Classification Search
CPC ............................. F16K 5/0657; F16K 5/0605
See application file for complete search history.

(56) References Cited

U.S. PATENT DOCUMENTS

| | | | | |
|---|---|---|---|---|
| 4,126,295 A | * | 11/1978 | Natalizia | ................. F16K 5/201 251/192 |
| 4,273,152 A | * | 6/1981 | Freeman | ............... F16K 5/0663 137/315.2 |
| 4,290,581 A | * | 9/1981 | Moran | .................... F16K 5/207 251/368 |

(Continued)

FOREIGN PATENT DOCUMENTS

| | | |
|---|---|---|
| JP | H5-92294 A | 9/1991 |
| JP | 05-27746 Y2 | 7/1993 |

(Continued)

OTHER PUBLICATIONS

PCT, International Search Report and Written Opinion for PCT/IB2021/050761, Apr. 15, 2021.

(Continued)

*Primary Examiner* — Reinaldo Sanchez-Medina
(74) *Attorney, Agent, or Firm* — Orrick, Herrington & Sutcliffe LLP

(57) ABSTRACT

A ball for a ball valve, wherein the ball comprises a substrate of metal having surface modified portions to act as seating surfaces for a seat of the ball valve; and a seat ring for a ball valve, wherein the seat ring comprises a substrate of metal having a surface modified portion to act as a seating surface for a ball of the ball valve.

3 Claims, 5 Drawing Sheets

(56) References Cited

U.S. PATENT DOCUMENTS

| | | | | |
|---|---|---|---|---|
| 5,088,687 | A | * | 2/1992 | Stender .................. F16K 5/0668 |
| | | | | 251/315.12 |
| 5,170,989 | A | | 12/1992 | Kemp |
| 5,455,079 | A | | 10/1995 | Oden et al. |
| 6,073,648 | A | * | 6/2000 | Watson .................. F16K 5/0657 |
| | | | | 106/14.33 |
| 8,978,691 | B2 | * | 3/2015 | Avdjian .................. F16K 25/02 |
| | | | | 251/192 |
| 2011/0260088 | A1 | * | 10/2011 | Cunningham ........ F16K 5/0642 |
| | | | | 251/315.01 |
| 2016/0161008 | A1 | * | 6/2016 | Webb .................. F16J 15/3284 |
| | | | | 251/315.01 |
| 2016/0201811 | A1 | * | 7/2016 | Hunter .................. F16K 5/0471 |
| | | | | 166/373 |
| 2017/0343118 | A1 | | 11/2017 | Balan |
| 2019/0162316 | A1 | * | 5/2019 | Kim ..................... F16K 25/005 |

FOREIGN PATENT DOCUMENTS

| | | |
|---|---|---|
| JP | H5-261590 A | 10/1993 |
| JP | H7-503304 A | 4/1995 |
| JP | 2005-265134 A | 9/2005 |
| JP | 2005-330982 A | 12/2005 |
| KR | 20-0224521 Y1 | 5/2001 |

OTHER PUBLICATIONS

PCT, International Preliminary Report on Patentability for PCT/IB2021/050761, Jun. 28, 2022.
Office Action in JP2022547183, mailed Oct. 4, 2024, 8 pages.

\* cited by examiner

FUSE-COATED BALL VALVE TRIM

CROSS-REFERENCE TO RELATED APPLICATIONS

This application is a national phase application from International Application No. PCT/IB2021/050761, filed on Feb. 1, 2021, which claims priority to Australian Patent Application No. 2020900303, filed on Feb. 4, 2020. Priority to the preceding patent applications is expressly claimed, and the disclosures of the preceding applications are hereby incorporated herein by reference in their entireties and for all purposes.

FIELD

The present invention relates to fuse-coated trim components for ball valves, such as balls and seats.

BACKGROUND

Ball valves used in severe service applications, such as pressure acid leaching of ores, are subject to high temperatures, high pressures, abrasive solids, and acid corrosion. Trim components of ball valves, such as balls and seats, are often thermally spray coated to improve their reliability and resistance to degradation or wear, such as abrasion, erosion and corrosion. For example, balls and seats made of titanium are thermally sprayed coated with coatings, such as chrome carbide.

Conventional thermally spray coated balls and seats suffer from several drawbacks. In use, the thermal spray coatings unpredictably delaminate and spall from the trim components which reduces the sealing efficiency of the ball valve. This delamination and spalling provide increased access of abrasive solids and corrosive acid to the underlying metal substrate that sets off a cycle of exacerbated deterioration, wear and corrosion. In addition, the delaminated or spalled coating poses contamination and damage hazards to plant and process equipment downstream of the ball valve.

In view of this background, a need exists for improved coated balls and seats for severe-service ball valves that have increased resistance against wear and corrosion, but decreased delamination and spalling (or increased adherence).

SUMMARY

According to the present invention, there is provided a ball for a ball valve, wherein the ball comprises a substrate of metal having surface modified portions to act as seating surfaces for a seat of the ball valve.

The substrate and surface modified portions may each comprise titanium or titanium alloy.

The surface modified portions may be formed by nitriding.

The surface modified portions may be formed by nitriding surface portions of the substrate to form a hard titanium nitride phase, and alloying the nitrided surface portions with a beta stabiliser to form a tough beta titanium phase which surrounds the hard titanium phase.

The surface modified portions may be densified to fill any cracks or voids.

The surface modified portions may comprise raised annular bands.

The raised annular bands may be metallurgically fused to the substrate by fusion welding.

The present invention also provides a seat ring for a ball valve, wherein the seat ring comprises a substrate of metal having a surface modified portion to act as a seating surface for a ball of the ball valve.

The substrate and surface modified portion may each comprise titanium or titanium alloy.

The surface modified portion may be formed by nitriding.

The surface modified portion may be formed by nitriding a surface portion of the substrate to form a hard titanium nitride phase, and alloying the nitrided surface portion with a beta stabiliser to form a tough beta titanium phase which surrounds the hard titanium phase.

The surface modified portion may be densified to fill any cracks or voids.

The surface modified portion may comprise a raised annular band.

The raised annular band may be metallurgically fused to the substrate by fusion welding.

The surface modified portion may comprise two axially spaced raised annular bands.

The seat ring may further comprise a band of low friction material between the two axially spaced raised annular bands.

The present invention further provides a kit of parts for a ball valve comprising the ball and two of the seat rings described above.

BRIEF DESCRIPTION OF DRAWINGS

Embodiments of the invention will now be described by way of example only with reference to the accompanying drawings, in which.

DESCRIPTION OF EMBODIMENTS

Figure 1:
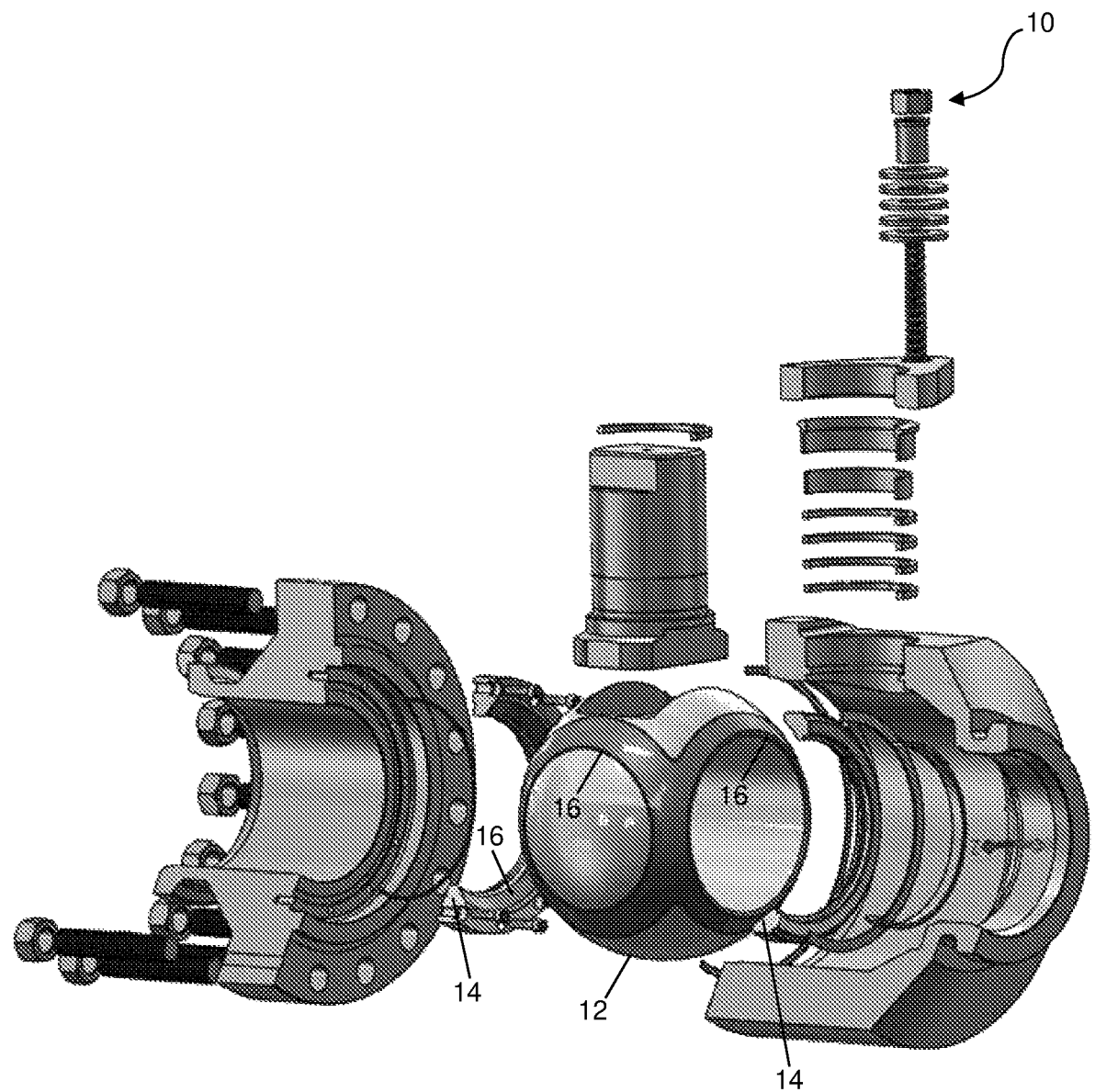
FIG. 1 is an exploded perspective view of a ball valve showing a fuse-coated ball and two fuse-coated seat rings according to an embodiment of the present invention.
Figure 2:
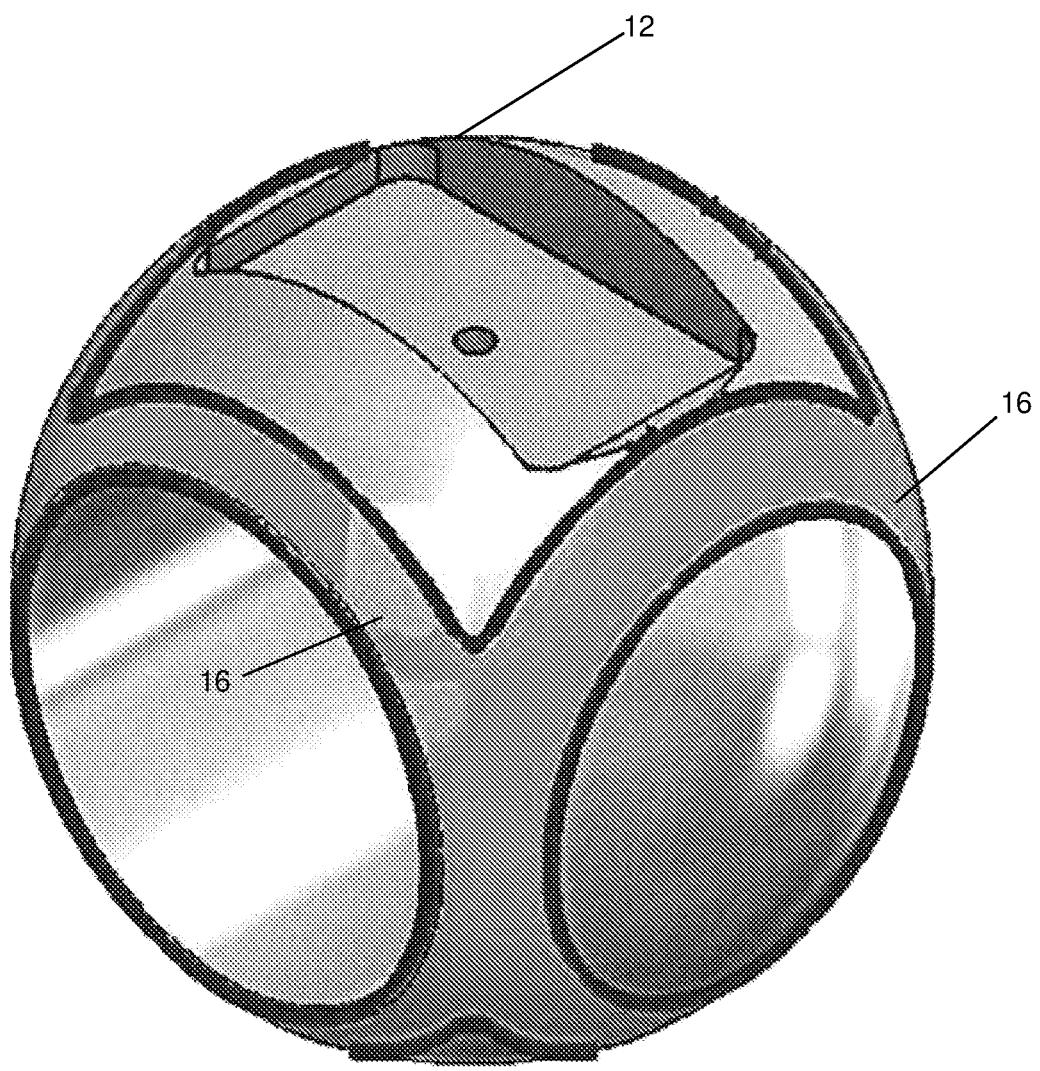
FIG. 2 is a perspective view of the fuse-coated ball of FIG. 1.
Figure 3:
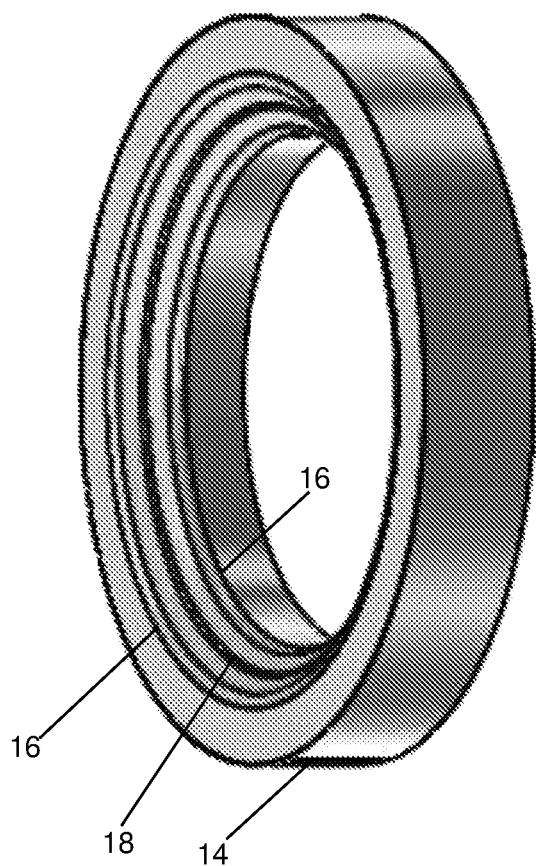
FIG. 3 is a perspective view of a fuse-coated seat ring of FIG. 1.

Referring to FIGS. 1 to 3, fused-coated trim components of a ball valve 10 according to an embodiment of the present invention may generally comprise a ball 12 between two seat rings 14. Prior to assembly of the ball valve 10, either new or repairable balls 12 and seat rings 14 may be prepared and coated in the following manner.

The 12 ball may comprise a substrate of metal having surface modified portions 16 to act as seating surfaces for the seat rings 14 of the ball valve 10. The substrate and surface modified portions may each comprise titanium or titanium alloy, for example, Titanium Grade 12.

The surface modified portions 16 may be formed by nitriding. The nitriding may be performed alone, or in combination with additional surface modification techniques, for example, those described in WO/2020/212883 by Callidus Welding Solutions Pty Ltd, which is hereby incorporated by reference in its entirety. Among other things, WO/2020/212883 describes forming surface modified portions by nitriding surface portions of a substrate to form a hard titanium nitride phase, and alloying the nitrided surface portions of the substrate with a beta stabiliser to form a tough beta titanium phase which surrounds the hard titanium phase.

The surface modified portions 16 may be densified to fill any cracks or voids, for example, using a thermal spray coating of one or more metal oxides, or one or more metal carbides. Further or alternatively, the surface modified portions 16 may be densified using a suitable sealant or filler, such as "XP 61" ceramic coatings produced by Fireside Coatings. The densified surface modified portions may then be machined to remove any excess densifying material from the seating surfaces.

Figure 4:
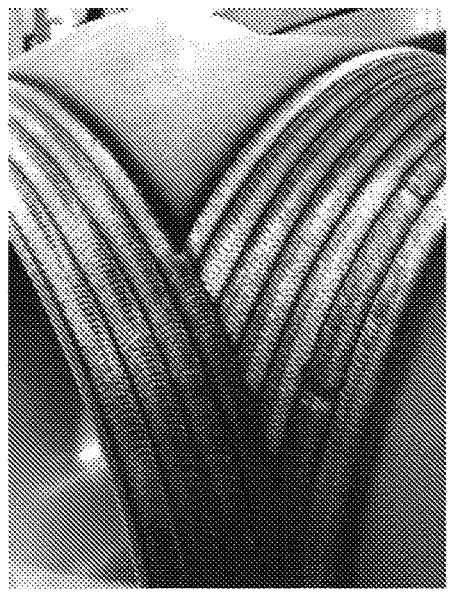
FIG. 4 is a photograph of raised annular bands of surface-modified titanium or titanium alloy formed of weld beads on the ball.
Figure 5:
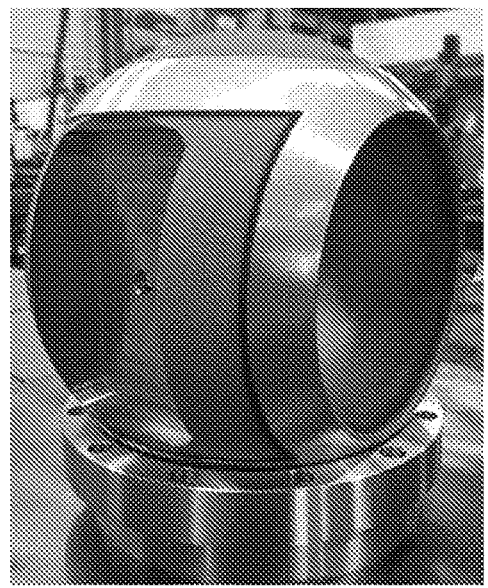
FIG. 5 is a photograph of the raised annular bands of the ball after machining.

Referring to FIGS. 4 and 5, the surface modified portions 16 of the ball 12 may comprise raised annular bands. The raised annular bands 16 may be metallurgically fused to the substrate, for example, by fusion welding, such as gas tungsten arc welding (GTAW). As shown in FIG. 4, the raised annular bands 16 may be formed on the ball 12 initially as annularly adjacent weld beads that are subsequently machined to required dimensions and surface finish as shown in FIG. 5, for example, by grinding, computer numerically controlled (CNC) machining, lapping, match lapping, etc.

Referring to FIG. 3, the seat ring 14 may comprise a substrate of metal having surface modified portions 16 to act as a seating surface for the ball 12 of the ball valve 10. Each of the two seat rings 14 may be formed, machined, and densified using the same or similar materials and techniques described above for the raised annular bands 16 of the fuse-coated ball 12.

In some embodiments, each seat ring 14 may comprise two or more axially spaced raised annular bands 16 to act as two or more spaced seating surfaces for the ball 12. Each seat ring 14 may further comprise a band of low friction material 18, such as polytetrafluoroethylene (PTFE) or polyetheretherketone (PEEK), between each pair of adjacent axially spaced raised annular bands 16.

The ball 12 may be matched lapped to the two seat rings 14, and the finished fused-coated trim components may be supplied to end users as a kit of parts for a ball valve.

The following example is intended to illustrate the invention. It is not intended to limit the scope of the invention.

EXAMPLE

Examples of a fuse-coated ball and two seat rings of a titanium alloy for a 10" Class 600 ball valve were prepared and coated in the manner described above. The surface-modified raised annular bands on the ball and seat rings were densified using a thermal spray coating of TiOxCrOx to leave a metallurgically fused coating having a finished thickness of around 1.5 mm. In comparison, conventional thermally spray coated balls have a coating thickness of around 0.5 mm.

Figure 6:
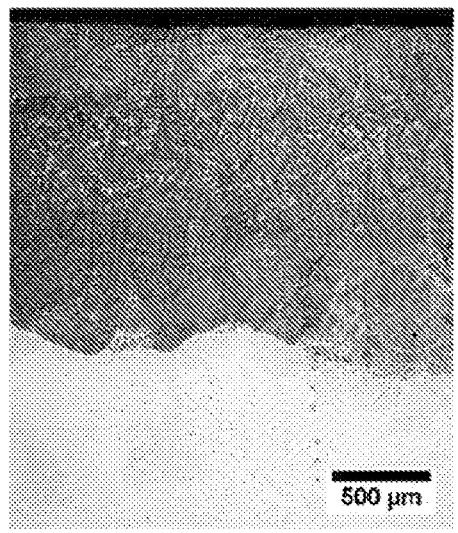
FIG. 6 is an optical micrograph showing metallurgical fusing between the raised annular bands and the substrate.
Figure 7:
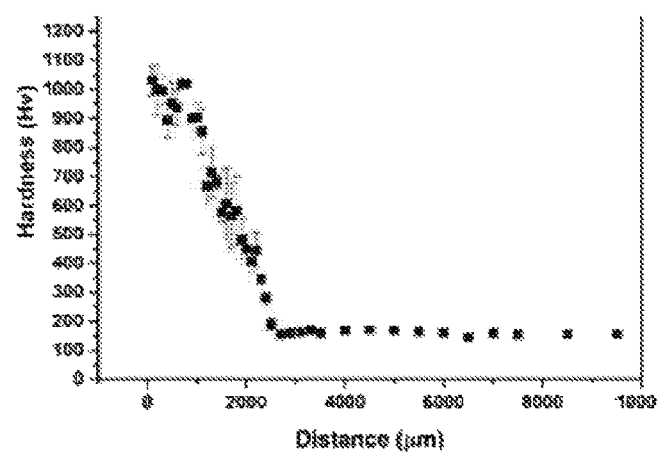
FIG. 7 is a graph of hardness profile of the surface of the raised annular bands.

FIG. 6 is an optical micrograph showing metallurgical fusing between the surface-modified raised annular bands and the substrate of the fuse-coated ball in this example. FIG. 7 shows that the surface-modified raised annular bands of the ball of this example had an increased hardness of up to around 1100 HV. In comparison, conventional thermally spray coated balls have a lower hardness of up to 900 HV.

The fuse-coated ball of this example was installed in-line at a high pressure acid leaching (HPAL) nickel plant as isolation trim in autoclave trains in parallel with conventional thermally spray coated titanium balls. The respective balls were then subjected to similar conditions, such as temperature, pressure and acidic slurry.

Figure 8:
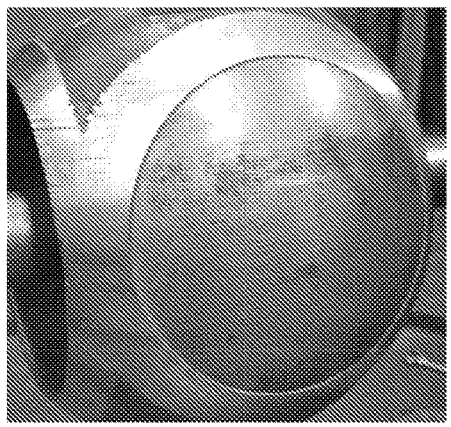
FIG. 8 shows an illustrative embodiment of an exemplary fuse-coated ball following twenty-nine months of in-line use.
Figure 9:
FIG. 9 is a photograph of a conventional thermally spray coated ball after severe-service.

The fuse-coated ball of this example was checked at the 12-month mark and returned directly back to service due to the trim's exceptional condition. It was only removed at the 29-month mark for research and development purposes, but otherwise was deemed in satisfactory condition for repair and reuse. FIG. 8 shows the fuse-coated ball of this example following 29 months of in-line use. In comparison, the service life of thermally spray coated balls in similar locations ranged from 7 to 24 months before unpredictable delamination resulted in loss of sealing efficiency. FIG. 9 shows an example of one of the conventional thermally spray coated balls suffering from thermal spray delamination after 7 months of in-line use.

Figure 10:
FIGS. 10 to 12 are photographs of a fuse-coated ball according to an embodiment of the present invention after severe-service.
Figure 11:
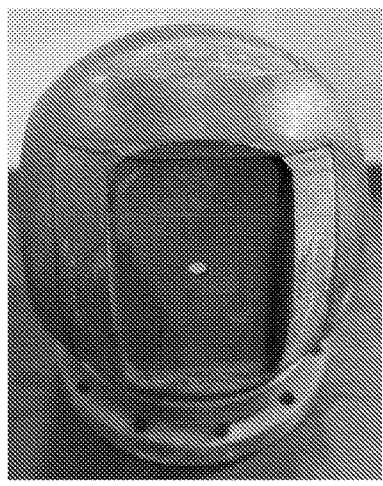
Figure 12:

In addition to the above in-line testing, the fuse-coated trim of this example was subjected to accelerated in-house testing. Before the accelerated testing, the fuse-coated trim was test against standardised pipeline valve specification, API 6D. The leakage rate was 0 ml/min versus the allowable factory acceptance test of 1.5 ml/min. The fuse-coated trim of this example was then subject to accelerated testing under simulated HPAL conditions of 255° C., 4,500 kPa and using client-supplied acidic slurry, the valve was stroked 200+ times at pressure with 20+ strokes at full differential pressure, simulating 4 years of severe service. The valve operated within acceptable torque demand range and isolation performance throughout testing. No seizure occurred throughout the entire testing duration. As shown in FIGS. 10 to 12, after this accelerated testing the fuse-coated ball of this example showed minimal scoring and could be returned to service with no repair.

In view of the above, it is believed that the fuse-coated trim of this example may be capable of significantly extending trim life, particularly during severe conditions such as flashing during opening and closing phases.

Embodiments of the present invention provide fuse-coated trim components for ball valves, such as balls and seats, that are both specifically and generally useful in severe-service ball valves, such as those used in pressure leaching service applications.

Although embodiments of the present invention have been described above by way of example only in the context of trim components for severe-service, metal-seated ball valves, it will be nevertheless appreciated that embodiments may be alternatively implemented to metallurgically fuse coat any and all metal components used in any and all industrial processes that require increased resistance against wear and corrosion, but decreased delamination and spalling (or increased adherence) compared to conventional thermal spray coatings.

For the purpose of this specification, the word "comprising" means "including but not limited to," and the word "comprises" has a corresponding meaning.

The above embodiments have been described by way of example only and modifications are possible within the scope of the claims that follow.

The invention claimed is:

1. A valve ball for a severe service ball valve, comprising:
a metal ball having a flow port extending along a first axis between a first opening and a second opening;
a first pair of sealing bands axially aligned with the flow port, each sealing band surrounding a respective one of the first and second openings; and
a second pair of sealing bands transversely located on the outer surface of the ball, the second pair being spaced apart and positioned on opposite sides of the flow port along a second axis orthogonal to the first axis,
wherein each of the sealing bands is formed from a material different from that of the metal ball, and
wherein each sealing band is metallurgically fused to the surface of the metal ball such that a fused microstructure is formed at the interface between the sealing band and the metal ball.

2. The valve ball of claim 1, wherein each sealing band comprises titanium nitride and the metal ball comprises titanium.

3. A kit of parts for a severe service ball valve, comprising: a metal valve ball comprising: a flow port extending along a first axis between a first opening and a second opening;
a first pair of sealing bands axially aligned with the flow port, each sealing band surrounding a respective one of the first and second openings; and a second pair of sealing bands transversely located on the outer surface of the valve ball, the second pair being spaced apart and positioned on opposite sides of the flow port along a second axis orthogonal to the first axis, wherein each of the sealing bands is formed from a material different from that of the metal valve ball, and wherein each sealing band is metallurgically fused to the surface of the metal valve ball such that a fused microstructure is formed at the interface between the sealing band and the metal valve ball; and a pair of valve seat rings, each comprising: a metal ring configured to receive the valve ball; and at least one sealing band metallurgically fused to an inner surface of the metal ring, the at least one sealing band being positioned and dimensioned to contact: the first pair of sealing bands surrounding the flow port openings of the valve ball when the valve ball is in an open position; and the second pair of sealing bands disposed on opposite lateral sides of the valve ball when the valve ball is in a closed position, wherein the at least one sealing band is formed from a material different from that of the metal ring, and wherein a fused microstructure is formed at the interface between the at least one sealing band and the metal ring, and wherein the pair of valve seat rings and the valve ball are cooperatively configured to provide sealing engagement in both the open and closed positions of the severe service ball valve.

* * * * *